United States Patent
Huang et al.

(10) Patent No.: US 6,871,115 B2
(45) Date of Patent: Mar. 22, 2005

(54) METHOD AND APPARATUS FOR MONITORING THE OPERATION OF A WAFER HANDLING ROBOT

(75) Inventors: Kuo-Liang Huang, Hsiu-Chu (TW); Enzo Kuo, Hsiu-Chu (TW); Patrick Chen, Tainan (TW); Yuan-Chich Lin, Feng-San (TW); Chih-Yi Lai, Hsin-Chu (TW); Chun-Hung Liu, Hsin-Chu (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 185 days.

(21) Appl. No.: 10/269,306

(22) Filed: Oct. 11, 2002

(65) Prior Publication Data

US 2004/0073336 A1 Apr. 15, 2004

(51) Int. Cl.[7] .............................................. G06F 19/00
(52) U.S. Cl. ..................... 700/245; 700/249; 700/253; 700/258; 700/264; 318/568.11; 318/568.24; 318/685; 901/44; 901/46; 901/49; 414/5; 414/744.3
(58) Field of Search ................................ 700/245, 249, 700/253, 258, 264; 318/568.11, 568.24, 685; 901/44, 46, 49; 414/5, 744.3; 345/156

(56) References Cited

U.S. PATENT DOCUMENTS 4,570,217 A * 2/1986 Allen et al. .................... 700/83
6,356,806 B1 * 3/2002 Grob et al. ................. 700/245
6,430,475 B2 * 8/2002 Okamoto et al. ........... 700/245
6,535,793 B2 * 3/2003 Allard ........................ 700/259
6,622,059 B1 * 9/2003 Toprac et al. ............... 700/121
6,693,708 B1 * 2/2004 Hunter ..................... 356/237.5
2002/0045410 A1 * 4/2002 Sakurai et al. ................ 451/57
2002/0188379 A1 * 12/2002 McGee et al. .............. 700/245
2003/0032207 A1 * 2/2003 Rengarajan et al. .......... 438/14
2004/0028516 A1 * 2/2004 Brogardh .................... 414/735
2004/0073335 A1 * 4/2004 Gong ......................... 700/245

OTHER PUBLICATIONS

Shih et al., Inexact algorithms for correction of errors due to flexibility of dynamic structures, 1996, IEEE, pp. 242–245.*

* cited by examiner

Primary Examiner—Thomas G. Black
Assistant Examiner—McDieunel Marc
(74) Attorney, Agent, or Firm—Tung & Associates

(57) ABSTRACT

The integrity of control signals used to control a wafer handling robot is monitored by a monitor connected to various points of the robotic control system. The monitor includes a memory for storing data sets representing correct, reference characteristics of the control signals. The monitor samples control signals at various points in the control system and compares these sampled signals with the stored reference characteristics in order to determine whether a signal disparity exists. If a disparity exists, the monitor generates an error.

19 Claims, 4 Drawing Sheets

METHOD AND APPARATUS FOR MONITORING THE OPERATION OF A WAFER HANDLING ROBOT

TECHNICAL FIELD

The present invention broadly relates to automated transport systems used in semiconductor manufacturing operations, and deals more particularly with a method and apparatus for monitoring signal integrity in a wafer handling robot system.

BACKGROUND OF THE INVENTION

Robotic systems are used extensively in semiconductor device manufacturing operations in order to minimize operator involvement, optimize efficiency and minimize potential contamination during processing. Robots are commonly employed to transfer one or more semiconductor wafers between storage locations and a plurality of processing stations. For example, a single robot is employed in a so-called "cluster tool" which consists of a modular, multi-chamber, integrated processing system. The robot forms part of a central wafer handling module and functions to transfer the wafers between a number of the peripheral process chambers. The robot is controlled by a controller, such as a PLC (programmable logic controller) which is connected by a multiconductor electrical cable and corresponding connectors to a robotic mechanism. Both the controller and the robotic mechanism have a plurality of electrically interconnected components through which control signals flow for determining the operation of a robot. For example, the controller typically will include a motor controller and a motor drive, and the robot will include multiple motors and corresponding shaft encoders which produce feedback signals indicative of the robot's position. Each of these electrical connecting lines and associated connectors represent opportunities for errors to be introduced into the signals as a result of any of a number of causes, including electrical interference, shorts, open circuits and signal crossover. Even small errors introduced into the control signals by any of these causes can result in robot malfunctions or transfer errors that in turn can produce wafer breakage or even equipment damage. The problem of maintaining signal integrity often becomes more difficult as robots age and the related cabling and connectors begin to experience slight deterioration.

In the past, problems with control signal integrity have been detected only after an error has been introduced into the control signals which has produced a corresponding error in the movement of the robot. Moreover, even after if it is known that there is a problem with signal integrity, it has been very difficult to trace the exact or even general location of the problem.

What is needed is a real-time control signal monitoring system that quickly determines whether an error has been introduced into the control signal and for identifying the location at which the error is introduced. The present invention is directed towards providing this solution.

SUMMARY OF THE INVENTION

According to one aspect of the invention, a method is provided for monitoring the operation of a robot used to transport wafers in a semiconductor manufacturing operation. The method includes sensing control signals sent to the robot by a controller, comparing these control signals to a set of reference data representing correct signal characteristics or commands to the robot, and issuing an error signal if the comparison indicates that the sensed signal did not properly match the reference data. The sampling step is performed by intercepting control and feedback signals at a plurality of intermediate transmission locations throughout electrical cables and connections which interconnect various parts of the control system.

According to another aspect of the invention, apparatus is provided for monitoring the operation of a robot used to transport wafers in a semiconductor manufacturing operation, comprising a monitor for sampling command signals issued by the controller and for sampling feedback signals generated by encoders forming part of the robot, and for comparing the sample signals with a set of stored reference data. The monitor issues an error signal depending upon the results of the signal comparison. The monitor is coupled through a set of electrical connections to both the controller and the robot, at a plurality of connections locations so as to allow sampling of signal at a number of locations in the transmission path of both the control signals, and feedback signals sent from the robot to the controller. The monitor includes a processor and memory in which the reference data are stored.

Accordingly, it is a primary object of the present invention to provide a monitor for detecting errors in control signals used to operate a wafer handling robot.

Another object of the invention is to provide a monitor as described above which is capable of detecting errors introduced into the control signals at any of a number of locations in the transmission path of the control signals.

Another object of the invention is to provide a monitor as described above which can be easily retrofitted with existing robotic control systems.

Still another object of the invention is to provide a monitor of the type mentioned above which allows real-time monitoring and detection of errors in control signals.

These, and further objects and advantages of the present invention will be made clear or will become apparent during the course of the following description of a preferred embodiment of the present invention.

BRIEF DESCRIPTION OF THE DRAWINGS

In the drawings, which form an integral part of the specification and are to be read in conjunction therewith, and in which like reference numerals are employed to designate identical components in the various views.

DETAILED DESCRIPTION OF THE PREFERRED EMBODIMENT

Figure 1:
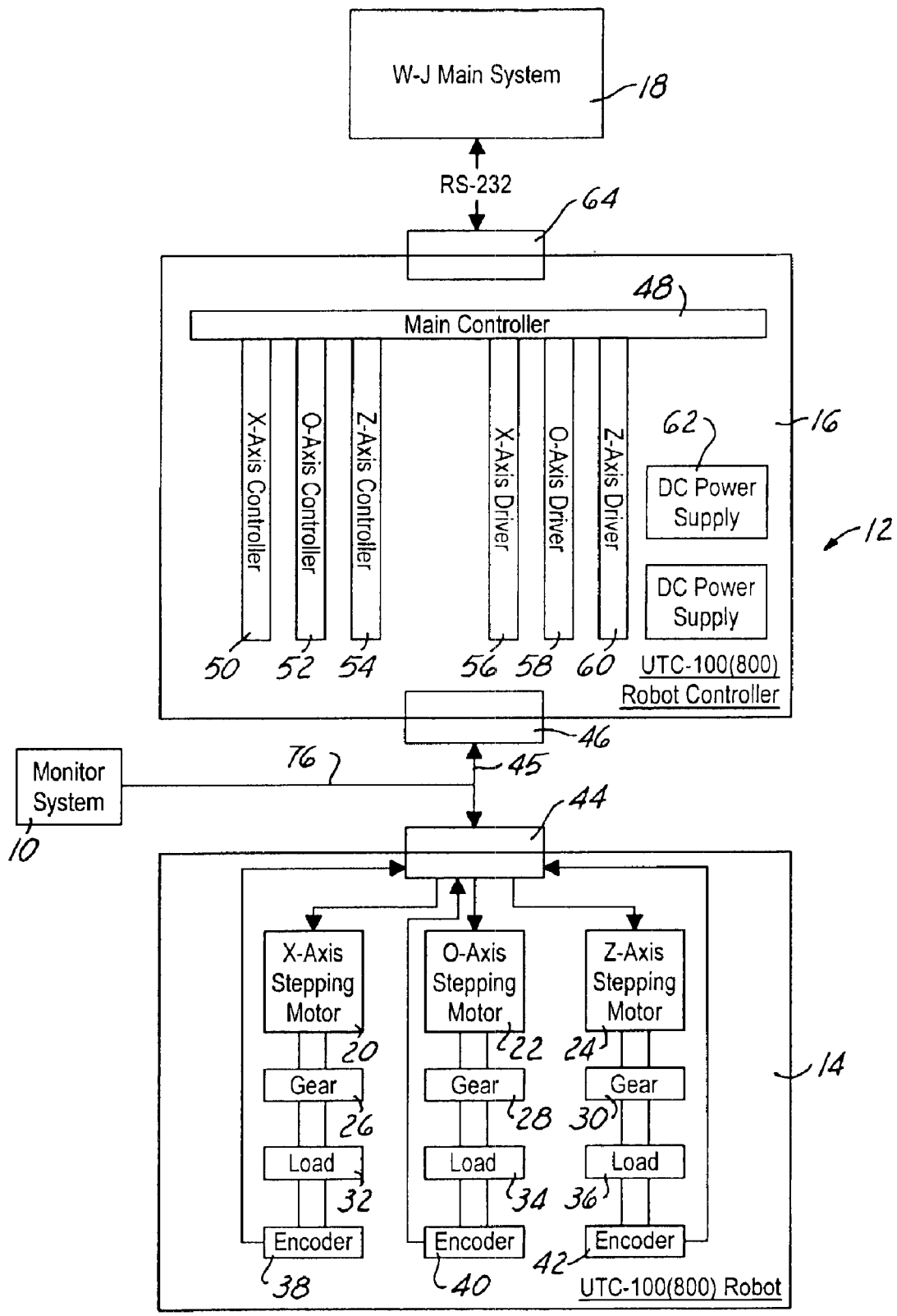
FIG. 1 is a block diagram of a control system for a wafer handling robot and the monitor therefor which forms the preferred embodiment of the present invention.

Referring first to FIG. 1, the present invention comprises a monitoring system 10 used to monitor signal integrity in a wafer handling robotic system generally indicated by the numeral 12 which comprises a robot controller 16 and a robotic mechanism 14. The wafer handling robot 12 is communicatively connected via connectors such as the RS-232 connector 64, to a semiconductor processing system 18 which may comprise, for example a single or multiple processing chamber, such as that forming a part of a cluster tool, in which fabrication processes are performed on one or more semiconductor wafers. The wafer handling system 12 functions to transfer one or more wafers within the processing system 18, and between the processing system 18 and a storage location (not shown). A master control system (not shown) operating the processing system 18 sends signals to the handling system 12 through the connector 64 in order to coordinate movements of the handling system 12 with operations in the processing system 18.

The controller 16 includes a main controller 48 which may be in the form of a PLC. Power is supplied to the controller 16 through one or more DC power supplies 62. Control signals are delivered from the main controller 48 to each of three motor controllers 50–54 and motor drivers 56–60. These controllers and drivers provide control signals to operate later discussed motors which control the movement of the robotic mechanism 14 about three separate axis, commonly referred to as X, Ø, Z axes.

The controller is electrically coupled with the robotic mechanism 14 by means of connectors 44, 46 and multiconductor cable 45. Depending upon the configuration of the controller 12, cable 45 may comprise a serial bus, or multiple, independent parallel line.

The robotic mechanism receives control signals through connector 44 which are delivered to each of three stepper motors 20, 22, 24 that respectively control the movement of the robotic mechanism 14 about the X, Ø, Z axes. More specifically, stepper motor 20 has an output shaft that drives a gear 26 which in turn moves a load 32, such as a robot arm. The mechanical movement produced by the stepper motor 20 is recorded by an encoder 38 which may consist, for example of a linear or rotational displacement transducer that produces digital signals representative of the magnitude of movement produced by the motor 20. The position signals produced by the encoder 38 are delivered back through the connector 44 to the controller 16 and thus act as feedback control signals which are interpreted by the controller 16 and used to make adjustments in the control signals in order to achieve the desired motion of the robotic mechanism 14. Stepper motor 22 likewise drives a gear 28 to move a load 34 and this movement is recorded by a second encoder 40 which delivers feedback position information to the controller 16. Finally, the Z axis stepper motor 24 also drives a gear 30 which moves a load 36, and the resulting Z axis movement sensed by encoder 42 is delivered in the form of a feedback signal through connector 44 to the controller 16.

Figure 2:
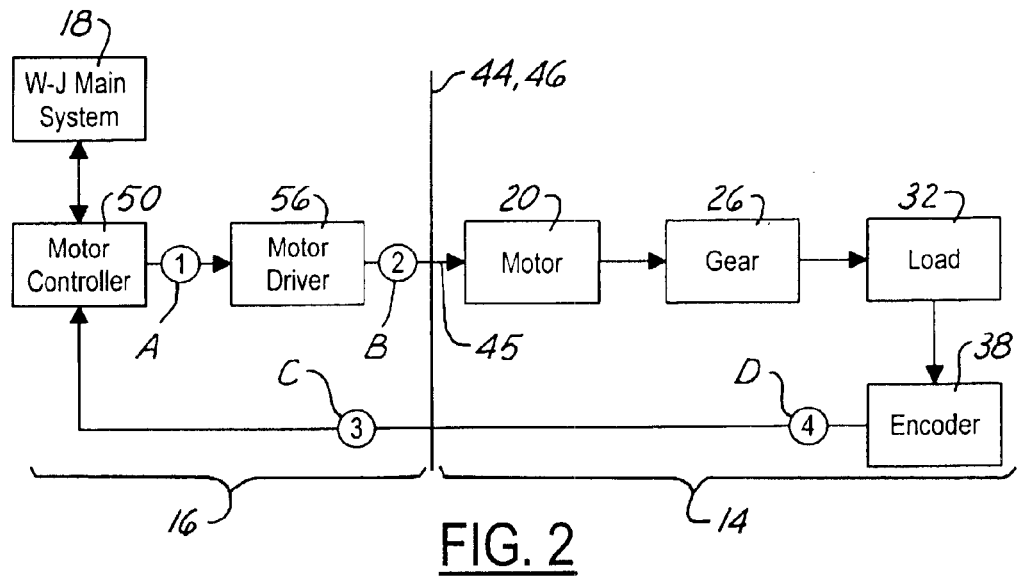
FIG. 2 is a block diagram of the robotic control system and showing the points of connection of the monitor therewith.

Reference is now made to FIG. 2 which shows the various components of the controller 16 and robotic mechanism 14 for only the X axis, it being understood that the components for the other two axes are identical to that shown in FIG. 2. The motor controller 50 issues a motor control signal to the motor drive 56. This drive signal comprise a series of pulses shown in the waveform diagram of FIG. 4. The motor drive 56 generates a drive signal that is delivered through the cable 45 to drive motor 20 which in turn drives the gear 26 and moves the load 32 as previously described. The drive signal produced by the motor drive 56 is shown in the waveform diagram of FIG. 5. As is evident from FIG. 2, the various components and modules of the wafer handling system 12 are interconnected by a plurality of separate, discrete electrical cables, each of which includes connectors that present an opportunity for errors to be introduced into the intended control signals.

In accordance with the present invention, the monitor 10 is connected at crucial points in the electrical connections between these various components and modules so a to provide real-time monitoring of the control and feedback signals. Depending upon the configuration of the controller 16, the monitor 10 may be connected either through a bus or through one or more discrete, parallel conductors to various points in the wafer handling system 12. In the illustrated embodiment of the invention shown in FIG. 2, however, the monitor system 10 is connected by one or more multiple cables 76 to points A, B, C, and D. Through the connections to the cables shown by A, B, C, and D, the monitor 10 intercepts and samples the signals at these points in their transmission. In the case of the controller 16, it may be seen that the monitor 10 samples the control signals both before and immediately after the signal is processed by the motor driver 56, but before the signal is passed through the connector 44. In this manner, control signals are sampled within the controller 16 before they are transmitted to the robotic mechanism 14.

It is equally important to assure the integrity of the feedback signal generated by the encoder 38. Accordingly, the feedback signal is sampled at point D, before the signal is transmitted along the cable 45, and then again at point C, immediately after the feedback signal has been received by the controller 16 but before delivery thereof to the motor controller 50.

Figure 4:
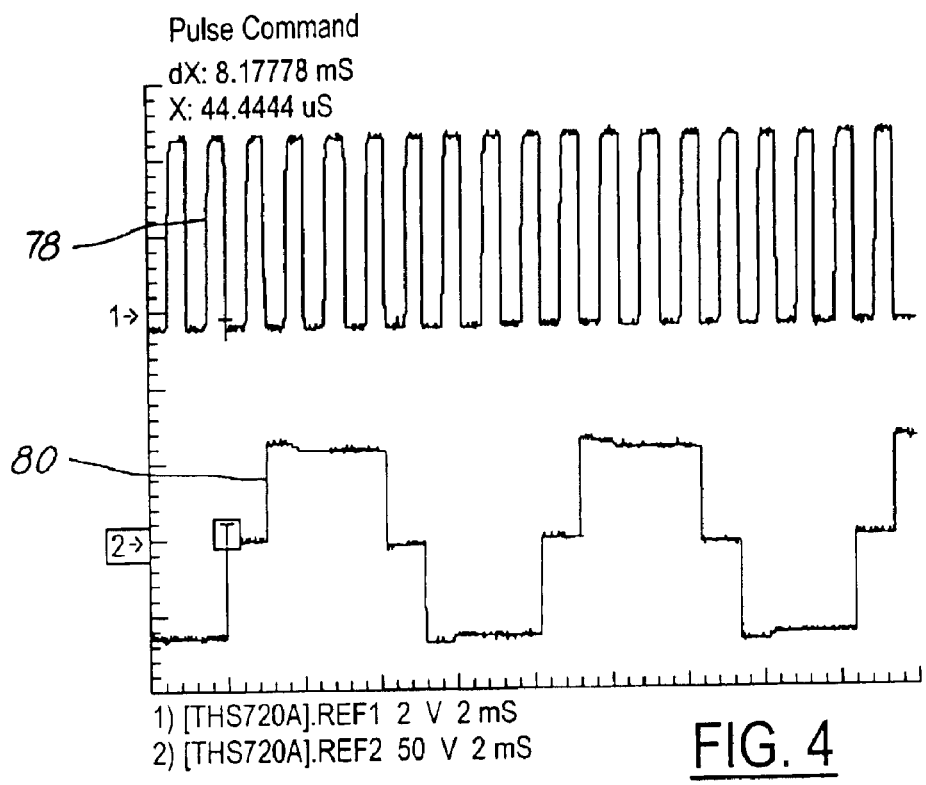

The information contained in the sampled signals derived at points A and D is useful in diagnosing a number of potential problems indicating either control signal errors or system malfunctions. For example, the signal delivered by the motor controller 50 to the motor driver 56 is a series of pulses referred to as pulse commands which are shown in FIG. 4. The monitor 10 compares the timing of the pulses sampled at point A with the timing of the motor driver output signals sampled at point B. If the compared timing is not within predetermined limits, the monitor 10 determines that an error or fault exists which is related to the motor drive 56 or its related electrical connections. Also, if the compared timing is within the predetermined limits but the voltage level of the signal sampled at point B is below a preselected voltage, monitor 10 recognizes a default which is most likely the result of a defect in interconnect cabling or connectors.

The monitor 10 can also perform a comparison of the signals sampled at points A and D. If the pulse command signal and the encoder feedback signal are not within an acceptable range relative to each other, i.e. the difference between these two signals is out of a pre-selected range, the monitor records this event as indicating that a defect exists either in the interconnect cabling or in the encoder 38. By comparing the signals sampled at points C and D, the monitor 10 can determine whether a fault exists in the interconnect cabling which couples the encoder 38 with the motor controller 50. Finally, since the encoder 38 outputs a series of feedback signals which are slightly different in phase, the monitor can determine whether there is an error in the encoder 38 or the cable connecting the encoder 38 with the motor controller 50 by sampling the feedback signal at point C and comparing different phases of the signals.

Figure 3:
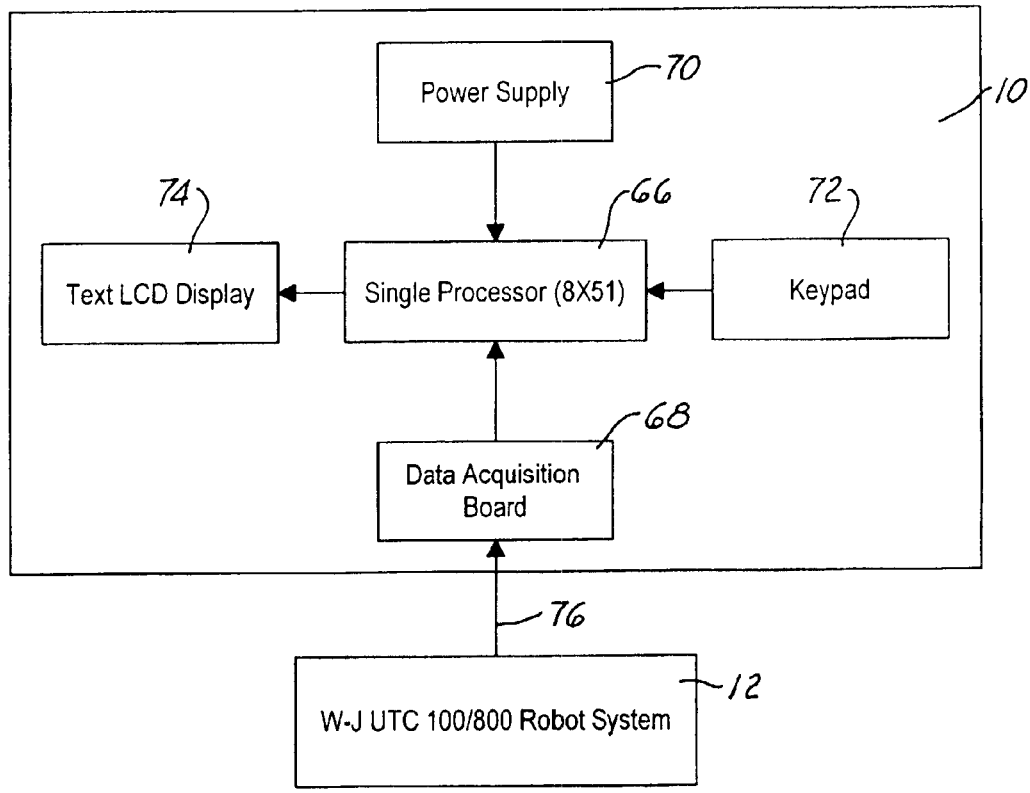
FIG. 3 is a block diagram showing the components of the monitor of FIGS. 1 and 2; and, FIGS. 4–6 are electrical waveform diagrams showing the signals sampled at various points in the control system of FIG. 1 in accordance with the present invention.

Referring now to FIG. 3, the monitor preferably includes a microcomputer in the form of a single processor 66 which includes an appropriate amount of memory for storing programmed instructions for controlling the monitor and for storing reference signal information and other data sets used in sampling the control system signals and comparing them to reference information or other threshold data. The sampled signals derived from the wafer handling system 12 are gathered by one or more conductors 76 and are assembled in a data acquisition circuit 68 before delivery to the processor 66. A keypad 72 is provided to communicate and input data to the processor 66, and a LCD display 74 is provided in order to display information generated by the processor 66. The display 74 also functions as an annunciator where error signals are displayed in the event that the processor 66 determines that an error exists in the control system. The monitor 10 includes a suitable DC power supply 70.

It should be noted here the reference information or data stored in the monitor 10 which is used as a basis for comparing the sampled signals may comprise a wide variety of information. For example, the stored data may comprise a full set of the characteristics that define a correct command or feedback signal, or the data may only comprise certain characteristics of the correct signals. Moreover, the stored data may comprise threshold type information or values that are used to determine whether the results of a signal comparison indicates a problem exists. In connection with the preferred embodiment, it has been found useful to store particular data and carry out certain comparisons which will now be described. Specifically, it has been found to be useful to compare the timing of the pulses output by the motor controller 50 with the timing of the drive signals output from the motor driver 56. In this case, the timing of the controller pulses constitutes the desired timing, and forms the stored reference data against which the timing of the sampled drive signals are compared.

It has been found useful to compare the voltage levels of the sampled signals with stored reference values representing correct values; if the voltage of the sampled signals is not at least as great as a stored reference value, a problem with connections or cabling is the likely cause.

It useful to compare characteristics of the signal output from the motor controller 50 with the signal output from the encoder 38; if the difference between these two signals is not within a certain range of reference values stored in the monitor 10, then an error in either one of the system components or the interconnections may exist.

Comparing the timing of the signal output from the encoder 38 at two different locations (points D and C) is useful in determining if a cable connection problem exists; the result of this timing comparison is a timing difference value that is compared to a reference or threshold value stored in the monitor 10.

Finally, it has been found to be useful to compare the phase of successive signals output from the encoder 38. The correct phase information from signals output from the encoder 38 is stored in the monitor 10. This stored, correct phase information is then compared with the phase information of subsequently sampled signals (at point D) to determine whether there has been a phase change. A change in the phase of the compared signals which is greater than a stored threshold amount, normally indicates a malfunction in the encoder 38 or its associated connection.

Referring now to FIG. 4, the upper waveform 78 represents the pulse command forming the control output at point A, and the lower waveform 80 represents the signal output from the motor driver 56. It can be appreciated from FIG. 4 that eight periods of pulse commands are equal to one period of the driver output.

Figure 5:
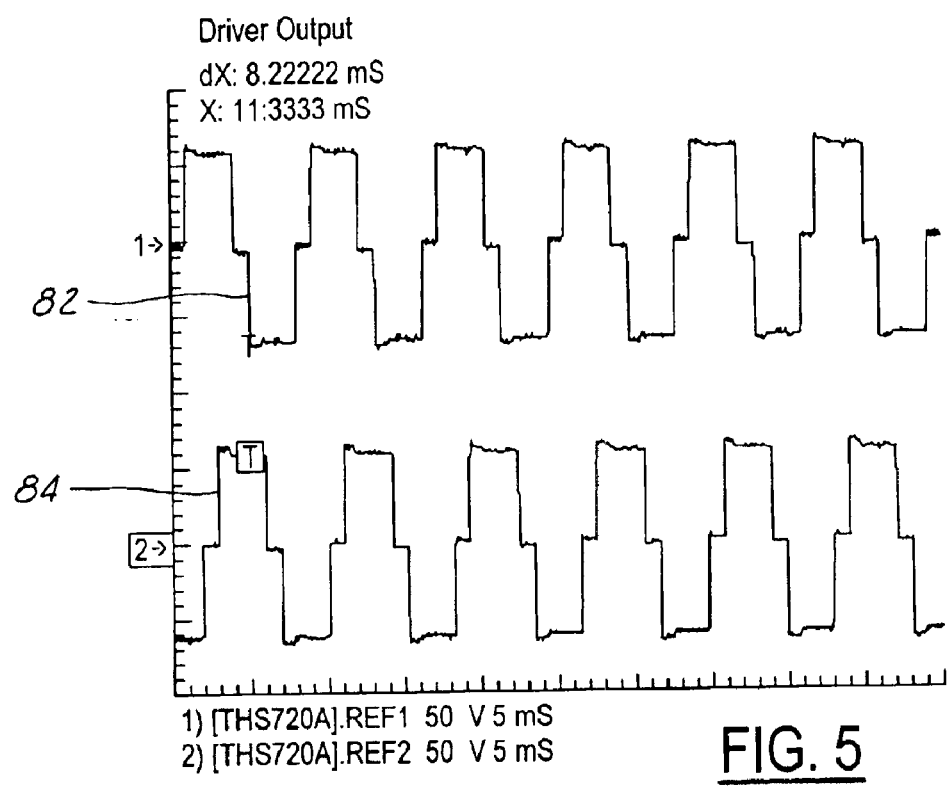

FIG. 5 depicts the two signals 82,84 output from the driver 56 which are used to drive the motor 20. It can be seen from this Figure that the these coupled two signals are 90 degrees out of phase with each other.

Figure 6:
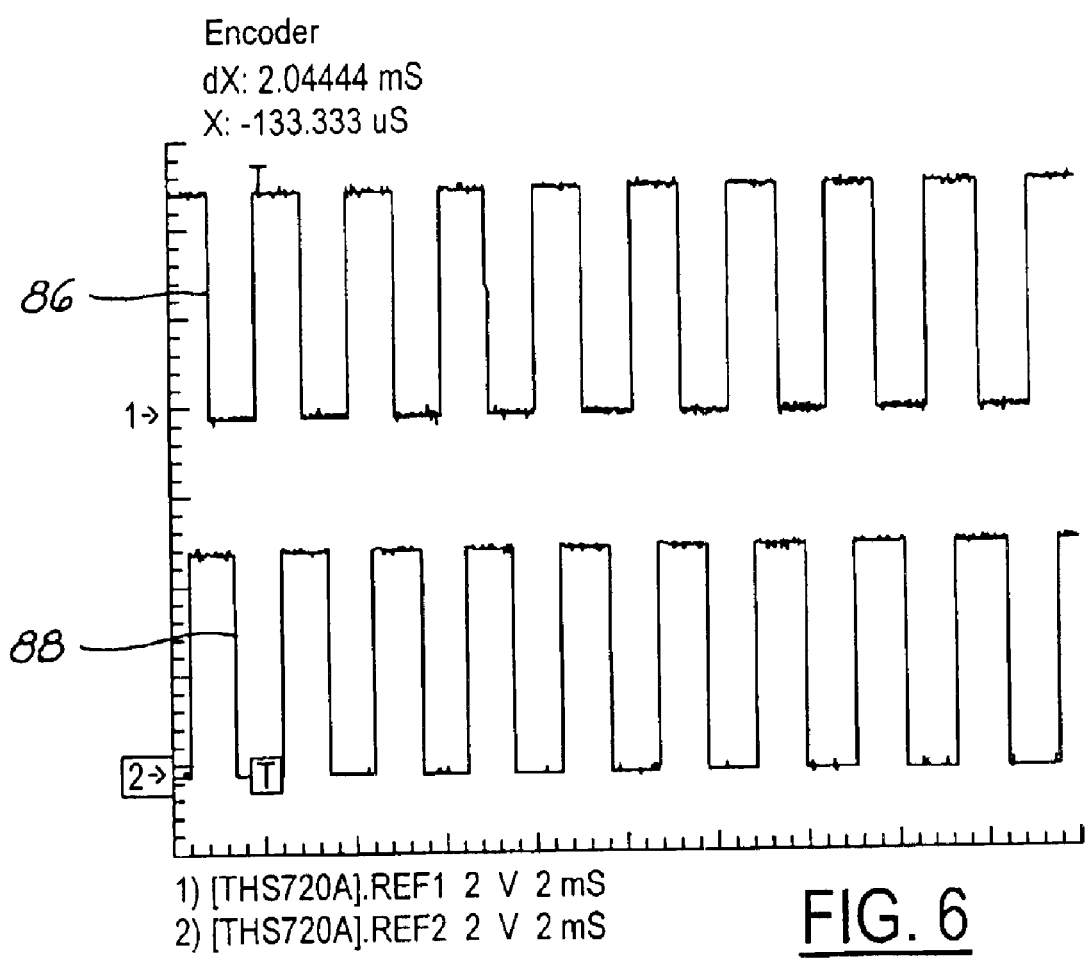

FIG. 6 depicts the 2 coupled signals shown in FIG. 5, in the respective phase shifted forms forms 86,88 that they are received by the encoder 38.

From the foregoing, it is apparent that the method and apparatus for monitoring a wafer handling g system as described above not only provides for the reliable accomplishment of the objects of the invention, but does so in a particularly simple and economic manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A method of monitoring the operation of a robot used to transport wafers in a semiconductor manufacturing operation, comprising the steps of:
    (A) sensing control signals sent to said robot by a controller, and detecting said signals during transmission thereof from a motor controller to a motor drive used to drive said robot;
    (B) comparing characteristics of the control signals sensed in step (A) with a set of reference characteristics representing correct commands to said robot; and,
    (C) issuing an error signal based on the comparison performed in step (B).

2. The method of claim 1, wherein step (A) includes detecting said signals during transmission thereof from said motor driver to a motor used to drive said robot.

3. The method of claim 2, including the steps of:
    (D) sensing a feedback position signals during transmission thereof from said robot to said controller,
    (E) comparing characteristics of the feedback signals sensed in step (D) with a set of reference characteristics, and
    (F) issuing an error signal if the comparison performed in step (E) indicates that the characteristics of the signals sensed in step (D) do not properly match said reference characteristics.

4. The method of claim 3, wherein step (D) is performed by sensing said feedback signals both before said signal passes through an electrical connector connecting said controller with said robot, and after said feedback signals passes through said connector.

5. The method of claim 1, wherein steps (A) through (C) are performed for each of three motor drives respectively controlling the movement of said robot about three axes.

6. The method of claim 1, wherein step (A) includes collecting first and second samples of said control signals by intercepting said control signals respectively before and after said controls signals pass through an electrical connector connecting said controller with said robot.

7. A method of monitoring the operation of a robot used to transport wafers in a semiconductor manufacturing operation, wherein said robot is of the type including a robot mechanism and a controller connected to the robot mechanism by an electrical connector, comprising the steps of:
    (A) sampling control signals transmitted from said controller to said robot mechanism by intercepting said control signals during the transmission thereof;
    (B) comparing the control signals sampled in step (A) with a first set of reference data related to correct commands to said robot;

(C) sampling feedback position signals transmitted from said robot mechanism to said controller by intercepting said feedback signals during transmission thereof;

(D) comparing the feedback signals sampled in step (C) with a second set of data related to correct feedback signals; and (E) issuing an error signal if either the comparison performed in step (B) indicates that the signals sensed in step (A) do not properly match said first set of data, or the signals sampled in step (C) do not properly match said second set of data.

8. The method of claim 7, wherein step (A) is performed by:

sampling said control signals both before and after said control signals pass through said electrical connector, and sampling said feedback signals both before and after said feedback signals pass through said electrical connector.

9. The method of claim 7, wherein steps (A) through (D) are performed for each of three motor drives respectively controlling the motion of said robot mechanism about three axes.

10. Apparatus for monitoring the operation of a robot used to transport wafers in a semiconductor manufacturing operation, wherein said robot includes a robotic mechanism driven by a motor and having an encoder for producing a feedback position signals, a controller including a motor controller and a motor drive for controlling the operation of said mechanism, and a set of electrical connections coupling said controller with said mechanism, comprising:

a monitor for sampling command signals issued by said controller and feedback signals generated by said encoder, for comparing said sampled signals with a set of reference data, and for issuing a error signal based on the signal comparison; and, a set of electrical connections between said monitor and said controller and said mechanism, said connections intercepting said command signals and said feedback signals and delivering said command signals and said feedback signals to said monitor.

11. The apparatus of claim 10, wherein said monitor includes a processor for comparing said sampled signals with said reference data, and including a memory for storing said reference data.

12. The apparatus of claim 11, wherein said monitor includes a data acquisition circuit for acquiring and collecting the sampled signals.

13. The apparatus of claim 12, including an annunciator for annunciating said error signal.

14. The apparatus of claim 10, wherein said electrical connections include a first connection for intercepting command signals transmitted from said motor controller to said motor drive.

15. The apparatus of claim 14, wherein said electrical connections include a second connection for intercepting signals transmitted from said motor drive to said motor.

16. The apparatus of claim 15, wherein said electrical connections include a third connection for intercepting feedback signals transmitted from said encoder to controller.

17. The apparatus of claim 16, wherein said robot further includes a connector coupling said robotic mechanism with said controller, said third connection includes a first portion for intercepting signals passing from said encoder to said to said connector, and a second portion for intercepting signals passing from said connector to said controller.

18. The apparatus of claim 10, wherein said electrical connections include a connection for intercepting signals transmitted from said motor drive to said motor.

19. The apparatus of claim 10, wherein said electrical connections include a connection for intercepting feedback signals transmitted from said encoder to controller.

* * * * *